Patented Mar. 24, 1931

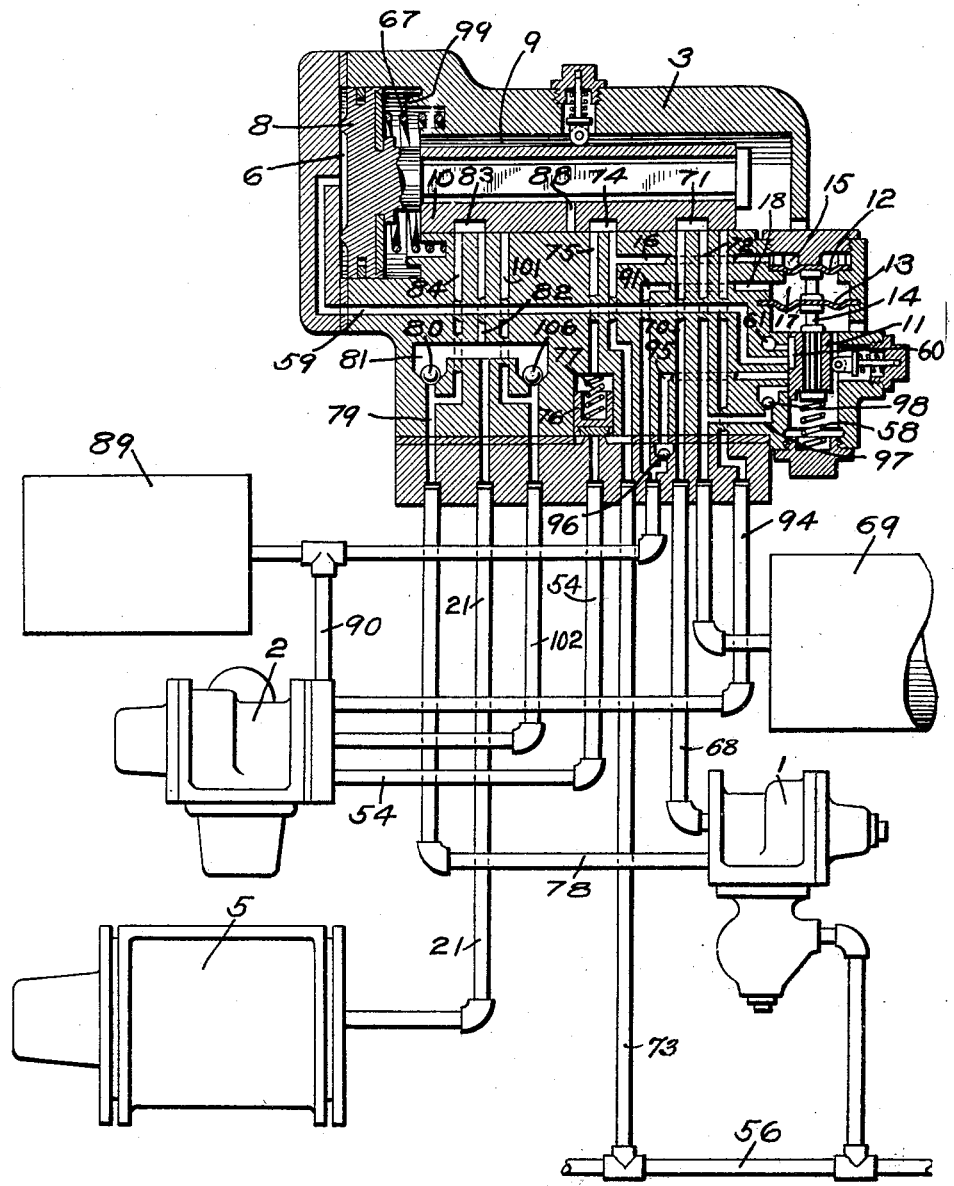

1,797,454

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed January 26, 1929. Serial No. 335,173.

This invention relates to fluid pressure brakes, and more particularly to a brake equipment adapted to control the brakes for different classes of service, such as passenger or freight service.

The principal object of my invention is to provide a fluid pressure brake equipment adapted to control the brakes in different classes of service and having means for automatically cutting in the brake controlling means for one class of service while cutting out the brake controlling means for the other class of service.

Other objects and advantages will appear in the following more detailed description of the invention.

In the accompanying drawing, the single figure is a diagrammatic view, partly in section, of a fluid pressure brake equipment embodying my invention.

The equipment may comprise a valve device 1 for controlling the brakes in freight service, a valve device 2 for controlling the brakes in passenger service, a change-over valve device 3, and a brake cylinder 5.

The change-over valve device 3 may comprise a casing having a piston chamber 6 containing a piston 8 and a valve chamber 9 in free communication with the atmosphere and containing a slide valve 10, adapted to be operated by piston 8.

For controlling the operation of piston 8, a slide valve 11 is provided and for operating the valve 11, flexible diaphragms 12 and 13 are connected to the valve 11 by a stem 14, the diaphragm 13 being of greater area than the diaphragm 12.

The chamber 15 at one side of diaphragm 12 is connected to a passage 16 which leads to a passage 73 communicating with the usual brake pipe 56. The chamber 17 intermediate the diaphragms 12 and 13 is connected by a passage 18 to a passage 91 which leads to the emergency reservoir 89 associated with the brake controlling valve device 2.

The automatic operation of the apparatus depends upon the different standard degrees of brake pipe pressure carried and it will be assumed that in freight service a standard predetermined brake pipe pressure less than 100 pounds is carried, while in passenger service, a standard predetermined brake pipe pressure in excess of 100 pounds is carried.

The apparatus being on a car in freight service where the standard brake pipe pressure is less than 100 pounds, the brake pipe pressure acting in diaphragm chamber 15 is not sufficient to overcome the pressure of spring 58, so that the diaphragms 12 and 13 and the slide valve 11 are maintained in their upper or freight position, as shown in the drawing. In this position, passage 59, leading to piston chamber 6, is connected, through cavity 60 in slide valve 11, with an atmospheric exhaust port 61, so that spring 67 acts to maintain piston 8 in its left hand position, as shown in the drawing.

In this position, the auxiliary reservoir 69 is connected to the auxiliary reservoir pipe 68 of the freight service brake controlling valve device 1, through passage 72, cavity 71 in slide valve 10, and passage 70, so that the auxiliary reservoir is charged with fluid under pressure as supplied from the brake pipe through the valve device 1. The brake pipe 56 is connected to the upper face of valve piston 76, through passage 73, cavity 74 and passage 75, so that brake pipe pressure with the pressure of spring 77 holds the valve piston 76 to its lower seat, in which communication from the brake pipe 56 to the pipe 54, leading to the valve device 2 is cut off.

The pipe 78, through which the brake controlling valve device 1 supplies fluid under pressure to the brake cylinder is connected to the brake cylinder 5, through passage 79, passage 84, cavity 83 in slide valve 10, passage 82, chamber 81, and pipe 21.

Pipe 102, through which fluid under pressure is supplied to the brake cylinder by operation of the valve device 2, is connected to a passage 101, leading to the seat of slide valve 10, but in the freight service position of slide valve 10, this passage is blanked.

The brake pipe 56 being cut off from the valve device 2, said valve device is rendered inoperative to control the brakes, and since the emergency reservoir 89 is therefore not charged with fluid under pressure, fluid pressure will not be supplied through passage 91 to the diaphragm chamber 17.

When it is desired to apply the brakes, the brake pipe pressure is reduced and the freight service brake controlling valve device 1 is operated in the usual manner to supply fluid under pressure from the auxiliary reservoir 69 to the brake cylinder 5. The brakes may be released by increasing the brake pipe pressure, so that the brake device 1 is operated to release fluid under pressure from the brake cylinder 5.

If a car equipped with the improved apparatus be shifted from freight to passenger service, upon charging up the brake pipe to the standard pressure carried in passenger service, for example, a pressure in excess of 100 pounds, the increased pressure supplied to diaphragm chamber 15 is sufficient to overcome the opposing pressure of spring 58, so that the diaphragms 12 and 13 and the slide valve 11 are shifted downwardly to a position in which a passage 97, leading to the auxiliary reservoir passage 72 is connected, past check valve 98, through cavity 60, with passage 59, leading to piston chamber 6.

Fluid from the auxiliary reservoir 69 is then supplied to piston chamber 6 and the piston 8 is thereby shifted to its inner position, moving the slide valve 10 to its passenger service position.

In passenger service position, the auxiliary reservoir passage 72 is connected to the auxiliary reservoir pipe 94 of the passenger service valve device 2, through cavity 71, so that when the valve device 2 is cut into operation, the auxiliary reservoir will be charged through the valve device 2. Passage 75, leading to the upper side of the valve piston 76, is connected to the atmosphere through port 88, so that brake pipe pressure, acting on the outer exposed area of the valve piston, on its lower face, operates to shift the valve piston to its upper seat and thereby communication is established from the brake pipe to the pipe 54, which is the brake pipe connection to the valve device 2.

The valve device 2 being charged with fluid under pressure from the brake pipe, the emergency reservoir 89 is also charged with fluid under pressure through the valve device 2 from the brake pipe in the usual manner.

As the emergency reservoir is charged with fluid under pressure, the diaphragm chamber 17 is also charged by flow through the passage 18. Pipe 102, through which the valve device 2 supplies fluid under pressure to the brake cylinder, is connected to the brake cylinder through passage 101, cavity 83 and passage 82.

When the brake pipe pressure is reduced to effect an application of the brakes, the valve device 2 is operated to supply fluid under pressure from the auxiliary reservoir 69 to the brake cylinder 5, while the valve device 1 is rendered inoperative, since the auxiliary reservoir is cut off from the valve device 1.

The brakes may be released by increasing the brake pipe pressure, so that the valve device 2 is operated to release fluid from the brake cylinder 5.

If the brake pipe pressure should be reduced to a degree lower than that employed in freight service, while the apparatus is set for passenger service, the change-over valve device will remain in passenger service position, since the emergency reservoir pressure acting in diaphragm chamber 17 will hold the diaphragms 12 and 13 in their lower position, even though the brake pipe pressure in chamber 15 be reduced below the standard brake pipe pressure carried in freight service.

If it is desired to shift a car equipped with the improved apparatus from passenger to freight service, the fluid pressure in the auxiliary reservoir 69 and in the emergency reservoir 89 must be bled down by operating the usual auxiliary reservoir release valve (not shown) which is associated with the auxiliary reservoir and a drain cock associated with the emergency reservoir.

The bleeding of the emergency reservoir causes the fluid pressure in diaphragm chamber 17 to be released, so that the brake pipe pressure in chamber 15 having been reduced to the standard freight service pressure, the diaphragms 12 and 13 and the valve 11 are shifted to their upper position by the spring 58. The piston chamber 6 is then vented to the atmosphere through cavity 60 and the exhaust port 61, so that piston 8 is shifted by spring 67 to its freight service position, in which slide valve 10 makes the necessary connections for permitting the freight service valve device 1 to function to control the brakes, while the passenger service valve device 2 is rendered inoperative to control the brakes, as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake equipment, the combination with a brake pipe and two brake controlling valve devices each operative by variations in brake pipe pressure for controlling the brakes, of means controlled according to the degree of brake pipe pressure for rendering one of said valve devices operative to control the brakes while the other valve device is rendered inoperative to control the brakes.

2. In a fluid pressure brake equipment, the combination with a brake pipe, one brake controlling valve device adapted to control the brakes for one kind of service and another valve device adapted to control the brakes for another kind of service, of means operative at one brake pipe pressure for rendering the first mentioned valve device operative to control the brakes while rendering the second mentioned valve device inoperative, and operative at a lower brake pipe pressure for rendering said first mentioned valve device inoperative while rendering the other valve device operative to control the brakes.

3. In a fluid pressure brake equipment, the combination with a brake pipe, a valve device operated by variations in brake pipe pressure for controlling the brakes in passenger service and a valve device operated by variations in brake pipe pressure for controlling the brakes in freight service, of means operated by the high brake pipe pressure carried in passenger service for rendering the passenger service valve device operative to control the brakes while the freight service valve device is rendered inoperative.

4. In a fluid pressure brake equipment, the combination with a brake pipe, a valve device for controlling the brakes in passenger service, and a valve device for controlling the brakes in freight service, of valve means for operatively connecting one or the other of said valve devices to control the brakes, a reservoir charged with fluid under pressure when the passenger service valve device is connected up to control the brakes, and means subject to the pressure of fluid in said reservoir for controlling the operation of said valve means.

5. In a fluid pressure brake equipment, the combination with a brake pipe, a valve device for controlling the brakes in passenger service, and a valve device for controlling the brakes in freight service, of valve means for operatively connecting one or the other of said valve devices to control the brakes, a reservoir charged with fluid under pressure when the passenger service valve device is connected up to control the brakes, and means controlled by brake pipe pressure for controlling the operation of said valve means and subject to the pressure of fluid in said reservoir.

6. In a fluid pressure brake equipment, the combination with a brake pipe, a valve device for controlling the brakes in passenger service, and a valve device for controlling the brakes in freight service, of valve means for operatively connecting one or the other of said valve devices to control the brakes, a reservoir charged with fluid under pressure when the passenger service valve device is connected up to control the brakes, and means operated at a predetermined pressure in the brake pipe for connecting up the passenger service valve device for controlling the brakes, said means being maintained in its passenger service position by the pressure of fluid in said reservoir.

7. In a fluid pressure brake equipment, the combination with a brake pipe, a valve device for controlling the brakes in passenger service, and a valve device for controlling the brakes in freight service, of valve means for operatively connecting one or the other of said valve devices to control the brakes, a reservoir charged with fluid under pressure when the passenger service valve device is connected up to control the brakes, and means operated at a predetermined pressure in the brake pipe for connecting up the passenger service valve device for controlling the brakes, said means being maintained in its passenger service position by the pressure of fluid in said reservoir upon reducing the brake pipe to effect an application of the brakes.

8. In a fluid pressure brake equipment, the combination with a brake pipe and two valve devices for controlling the brakes, of valve means operative to connect up one or the other of said valve devices to control the brakes, a reservoir charged with fluid under pressure upon connecting up one of said valve devices to control the brakes, and means subject to the pressure of fluid in said reservoir and in the brake pipe for controlling the operation of said valve means.

In testimony whereof I have hereunto set my hand, this 21st day of January, 1929.

THOMAS H. THOMAS.